United States Patent
Kimura et al.

[11] Patent Number: 6,158,413
[45] Date of Patent: Dec. 12, 2000

[54] DIRECT INJECTION DIESEL ENGINE

[75] Inventors: Shuji Kimura; Eiji Aiyoshizawa, both of Yokohama, Japan

[73] Assignee: Nissan Motor Co., Ltd., Yokohama, Japan

[21] Appl. No.: 09/525,054

[22] Filed: Mar. 14, 2000

[30] Foreign Application Priority Data

Mar. 19, 1999 [JP] Japan .................................. 11-076222

[51] Int. Cl.⁷ .................................................... F02B 47/08
[52] U.S. Cl. ........................................................... 123/306
[58] Field of Search ............................. 123/306, 568.25, 123/568.28, 568.29, 568.3

[56] References Cited

U.S. PATENT DOCUMENTS

| | | | |
|---|---|---|---|
| 3,786,792 | 1/1974 | Pelizzoni et al. | 123/90.16 |
| 4,429,669 | 2/1984 | Burley | 123/292 |
| 4,444,166 | 4/1984 | Kovacs et al. | 123/1 A |
| 4,644,926 | 2/1987 | Sakurai et al. | 123/568.28 |
| 5,201,300 | 4/1993 | Iiyama | 123/568.28 |

FOREIGN PATENT DOCUMENTS

| | | |
|---|---|---|
| 7-4287 | 1/1995 | Japan . |
| 8-86251 | 4/1996 | Japan . |
| 11-107820 | 4/1999 | Japan . |

OTHER PUBLICATIONS

Masanori Yoshioka, "Development of Diesel Engine for '94 USA Emission Regulation 6HB1–X Engine for Medium–Heavy Duty Trucks," New Developed Engines, Society of Automotive Engineers of Japan, Inc. (1995), pp 47–52.

*Primary Examiner*—Erick Solis
*Attorney, Agent, or Firm*—Foley & Lardner

[57] ABSTRACT

A fuel injection timing of a fuel injector (22) of a direct injection diesel engine is retarded to compression top dead center or even later. All of the required fuel injection amount is injected by the fuel injector (22) in an ignition delay period. The oxygen concentration in the combustion chamber (14) is decreased by exhaust gas recirculation. A swirl is set up in the combustion chamber (14) by a variable swirl generator (31). The compression ratio of the engine is preferably set to 15 or less, the vertical gas velocity in the combustion chamber is reduced by adopting a shallow piston cavity, and the cylinder internal maximum pressure is suppressed to 12 MPa or less.

13 Claims, 20 Drawing Sheets

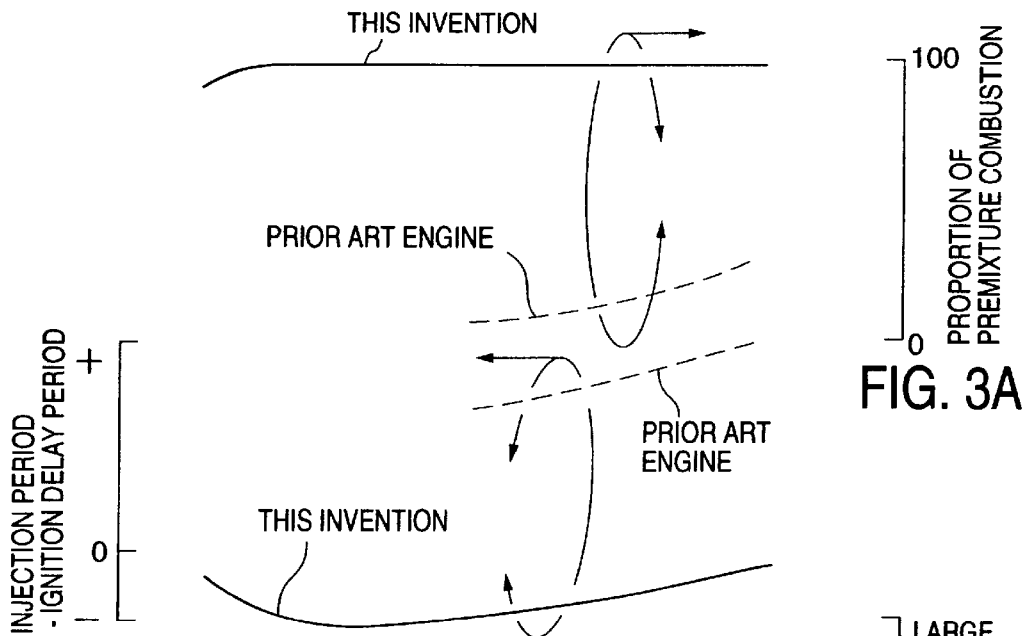
FIG. 3A
FIG. 3B
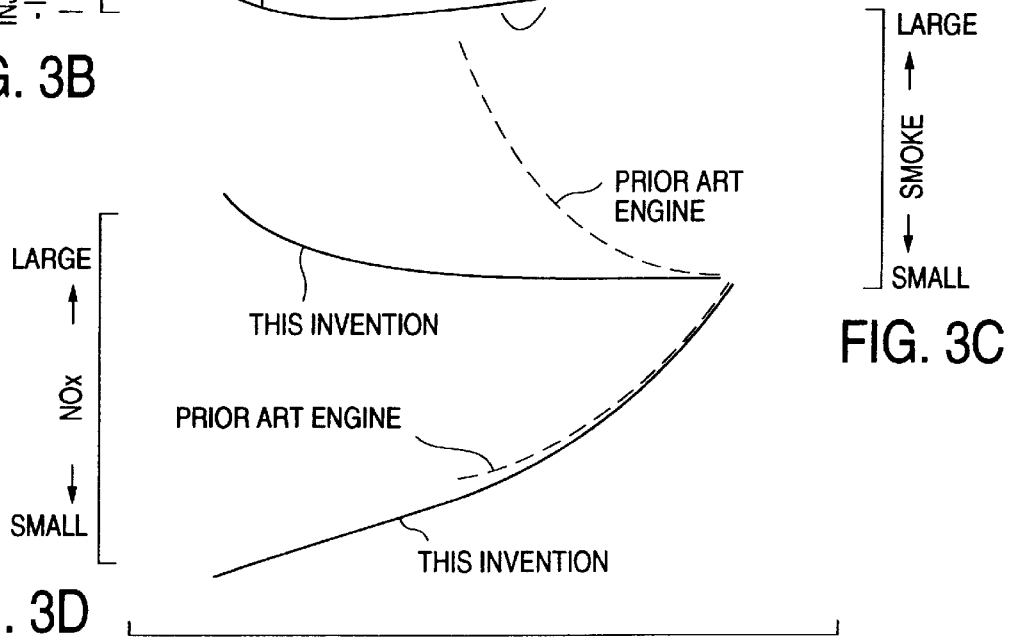
FIG. 3C
FIG. 3D
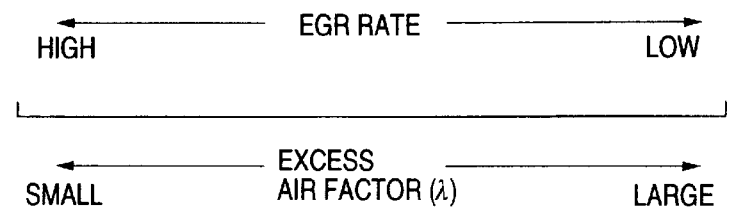

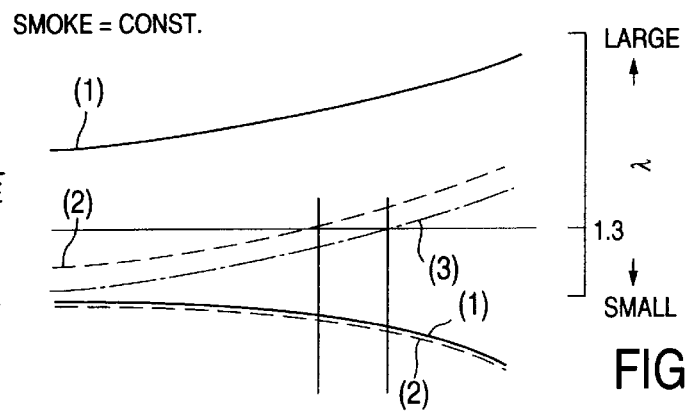
FIG. 9A
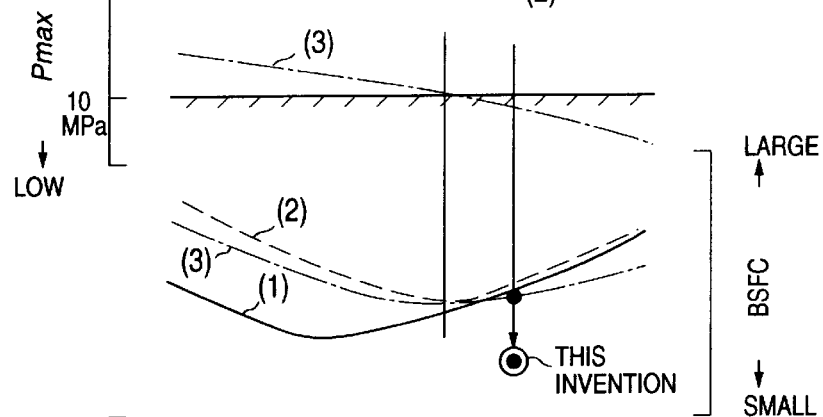
FIG. 9B
FIG. 9C
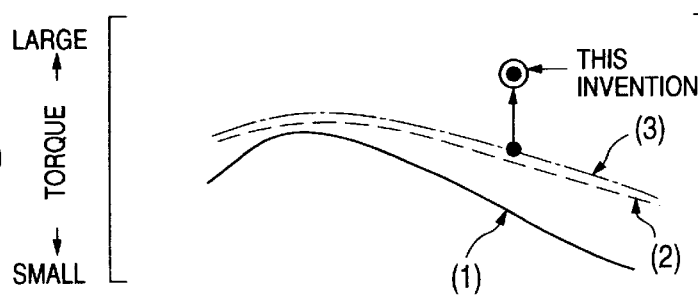
FIG. 9D

ε = 13

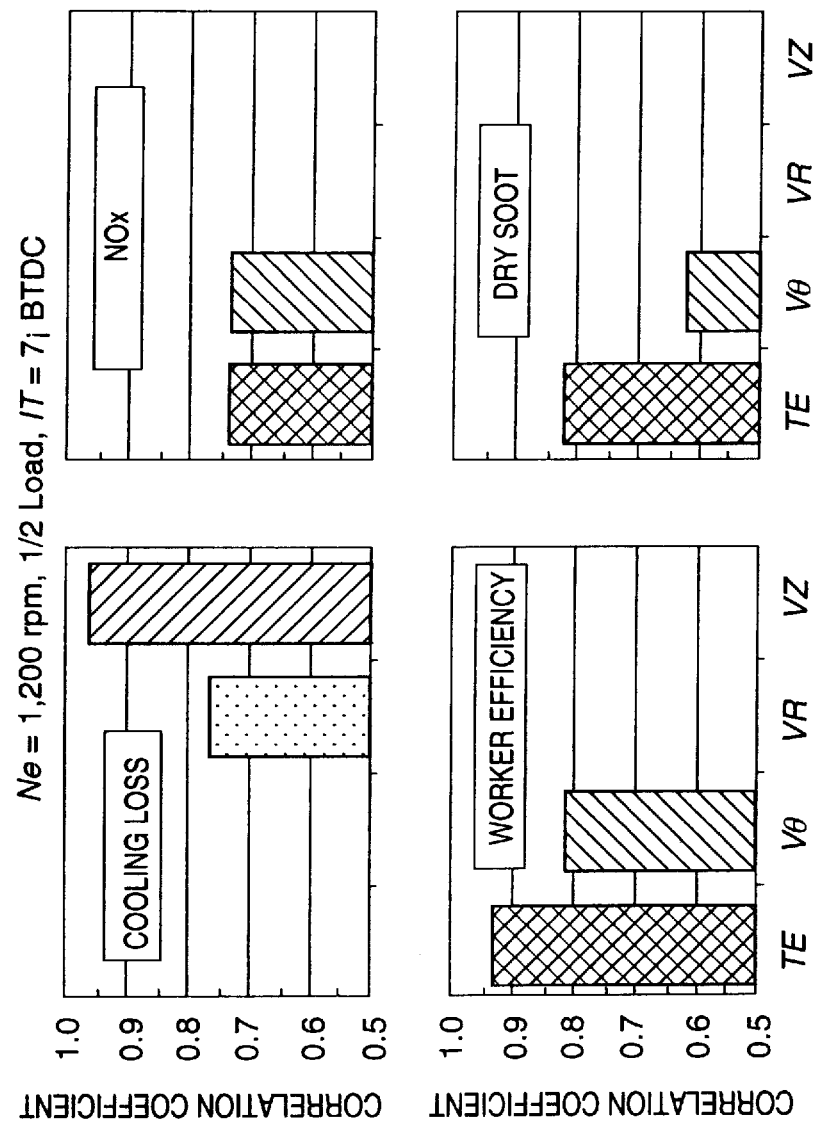

DIRECT INJECTION DIESEL ENGINE

FIELD OF THE INVENTION

This invention relates to a direct injection diesel engine.

BACKGROUND OF THE INVENTION

An article entitled "Development of Diesel Engine for '94 U.S.A. Emission Regulations" on p47–p52 of "Newly Developed Engines" published by the Society of Automotive Engineers of Japan, Inc. in 1995 discloses reduction of premixture combustion and promotion of diffusive combustion to reduce nitrogen oxides (NOx) and particulate matter (PM) emitted by a direct injection diesel engine.

When premixture combustion is performed, fuel injection is performed far in advance of the compression top dead center of an engine piston, fuel is vaporized during the ignition delay period and fuel is burnt all at once.

Consequently, although discharge of PM is suppressed, as combustion occurs abruptly, the combustion temperature increases and NOx occurs in large quantities. Therefore, premixture combustion should be suppressed in order to reduce NOx. Various methods are used to achieve this, e.g., exhaust gas recirculation (EGR), retardation of fuel injection start timing, higher compression ratio, and reduction in size of the injection nozzle of the fuel injector.

Near compression top dead center, the temperature of the combustion chamber is high and the fuel which is injected near the compression top dead center is burnt immediately after injection. This type of combustion is called diffusive combustion, and as the fuel is not all burnt at once, there is little temperature rise due to the combustion and the discharge of NOx decreases.

However, as the injected fuel is burnt without being completely vaporized, mixing of fuel and air is not complete and the discharge of PM increases. Hence, to promote the flow of air in the combustion chamber so as to assist the mixing of fuel and air, a deep cavity is formed in a piston and the formation of squish flow by intake air is promoted.

SUMMARY OF THE INVENTION

However, if the compression ratio of the intake air is increased, the construction of the engine body such as the cylinder block, connecting rods and crankshaft must be strengthened against increase of cylinder internal pressure. This causes an increase in weight, increase in friction losses and impairment of fuel cost-performance.

Further, the higher compression ratio of the intake air makes it difficult to use a common engine body for both diesel engines and gasoline engines.

On the other hand, if a powerful squish is generated in the combustion chamber, cooling losses will increase and fuel cost-performance will worsen.

Such a squish also reduces the startability of the engine and promotes the generation of white smoke at low temperature.

It is therefore an object of this invention to reduce the compression pressure and the oxygen concentration of a diesel engine without increasing the discharge of noxious matter.

It is a further object of this invention to increase the ignition delay of the diesel engine.

It is a still further object of this invention to weaken squish.

In order to achieve the above objects, this invention provides a direct injection diesel engine which directly injects fuel into a combustion chamber, comprising a cylinder, a piston forming the combustion chamber in the cylinder, a fuel injector which starts injection of fuel at a timing not before compression top dead center of the piston and finishes the injection of all of a required amount of fuel during an ignition delay period, an exhaust recirculation passage which decreases an oxygen concentration in the combustion chamber by mixing part of the exhaust gas discharged from the combustion chamber with intake air of the combustion chamber, and a variable swirl generator for setting up a swirl in the combustion chamber, wherein a maximum pressure in the combustion chamber is set not greater than twelve Megapascals.

This invention also provides a method for enabling low temperature premixture combustion in a direct injection diesel engine which directly injects fuel into a combustion chamber formed by a piston by means of a fuel injector. The method comprises retarding a fuel injection timing of the fuel injector to a timing not before compression top dead center of the piston, determine a fuel injection amount of the fuel injector so that an injection of all of a required amount of fuel is completed within an ignition delay period, decreasing an oxygen concentration of the combustion chamber by mixing a part of exhaust gas discharged from the combustion chamber with an intake air of the combustion chamber, setting a compression ratio of the engine not greater than fifteen, forming a cavity in a top surface of the piston which has a shape suppressing a vertical gas velocity in the combustion chamber, and setting a maximum pressure in the combustion chamber not greater than twelve Megapascals.

The details as well as other features and advantages of this invention are set forth in the remainder of the specification and are shown in the accompanying drawings.

BRIEF DESCRIPTION OF THE DRAWINGS

FIGS. 3A–3D are diagrams of an exhaust gas recirculation rate, combustion characteristics and noxious matter discharge amount in the direct injection diesel engine according to this invention in comparison with a prior art direct injection diesel engine.

FIGS. 9A–9D are diagrams showing the relations between fuel injection timing, excess-air factor (λ), maximum pressure (Pmax) in a cylinder, specific fuel consumption (BSFC) and torque in the direct injection diesel engine according to this invention in comparison with those of the prior art direct injection engine.

FIGS. 18A–18D are diagrams showing the relation of turbulence energy (TE), cavity inner circumferential velocity (Vθ), radial velocity (VR) and vertical velocity (VZ) to cooling loss, work efficiency, NOx (nitrogen oxide) generation amount and dry soot generation amount in a general direct injection diesel engine.

DESCRIPTION OF THE PREFERRED EMBODIMENTS

Figure 1:
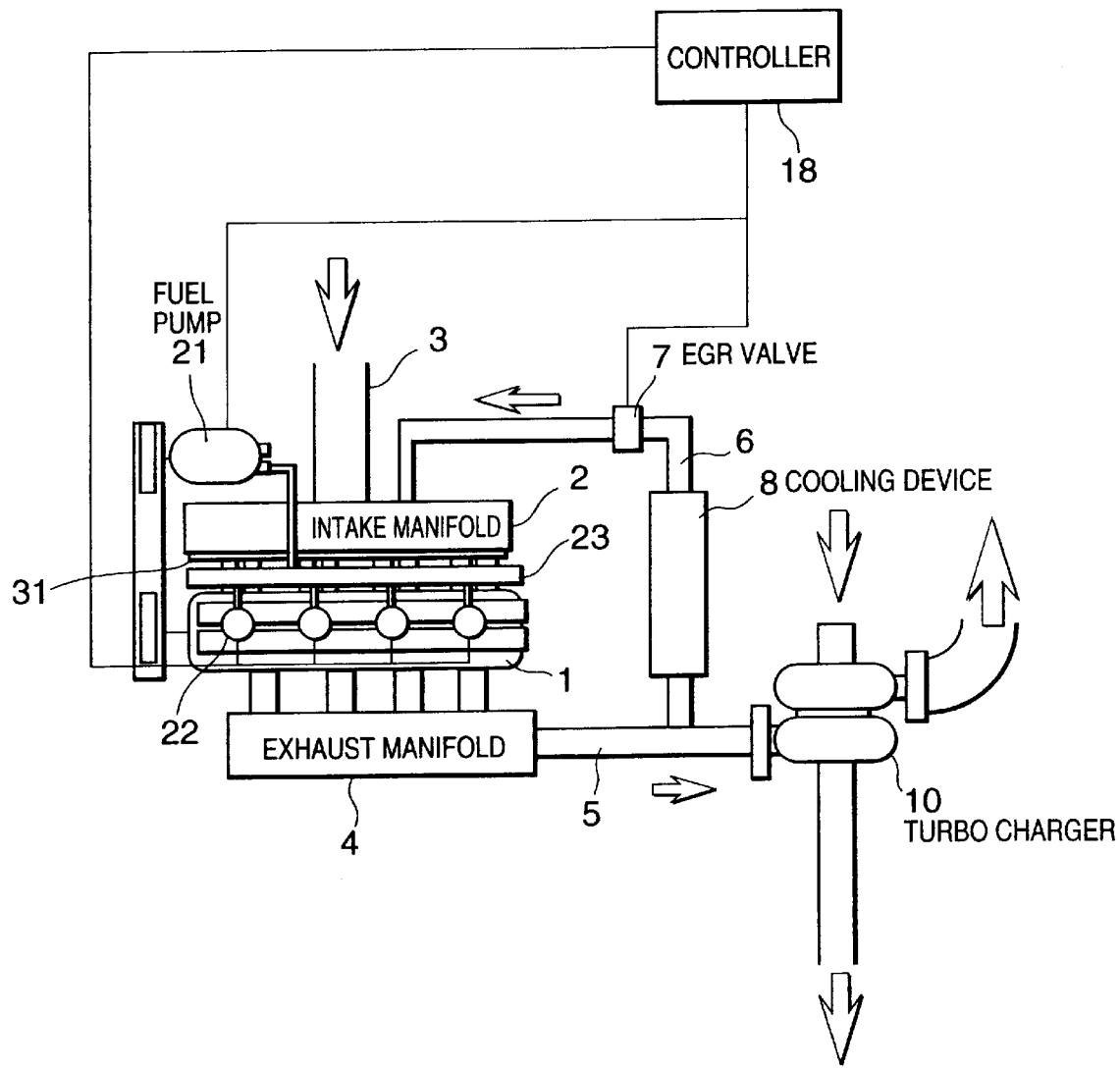
FIG. 1 is a schematic diagram of a direct injection diesel engine according to this invention.

Referring to FIG. 1 of the drawings, a multi-cylinder direct injection diesel engine 1 comprises an intake manifold 2, intake passage 3, exhaust manifold 4 and exhaust passage 5. An exhaust gas recirculation (EGR) passage 6 which recirculates part of the exhaust gas of the exhaust passage 5 is connected to the intake manifold 2.

The flowrate of the EGR passage 6 is adjusted by an EGR valve 7 according to a signal from a controller 18.

A water-cooled or air-cooled cooling device 8 is installed midway in the EGR passage 6 to cool recirculated exhaust gas.

A turbocharger 10 for turbocharging intake air using exhaust gas energy is provided in the exhaust passage 5.

The engine 1 is provided with a variable swirl generator 31 which sets up a swirl in the flow of intake air aspirated into each combustion chamber of the engine 1. The swirl generator 31 also controls the magnitude of the swirl according to the engine running state.

The engine 1 is also provided with a fuel injection device of the common rail type by which fuel is supplied to each combustion chamber. The fuel injection device supplies fuel pressurized by a fuel pump 21 to a fuel injector 22 installed in each cylinder via an accumulator 23, and the fuel is injected in the cylinder by the fuel injector 22 according to an injection signal output from the controller 18.

The fuel injector 22 comprises a solenoid valve and a nozzle, and the fuel injection timing and amount as well as a pilot injection are controlled via the injection signal.

The nozzle comprises a high capacity nozzle so that all the required fuel can be injected in an ignition delay period.

The fuel pressure accumulated by the accumulator 23, i.e., the fuel injection pressure, is adjusted through the control of the fuel pump 21 by the controller 18 according to engine running conditions.

Figure 2:
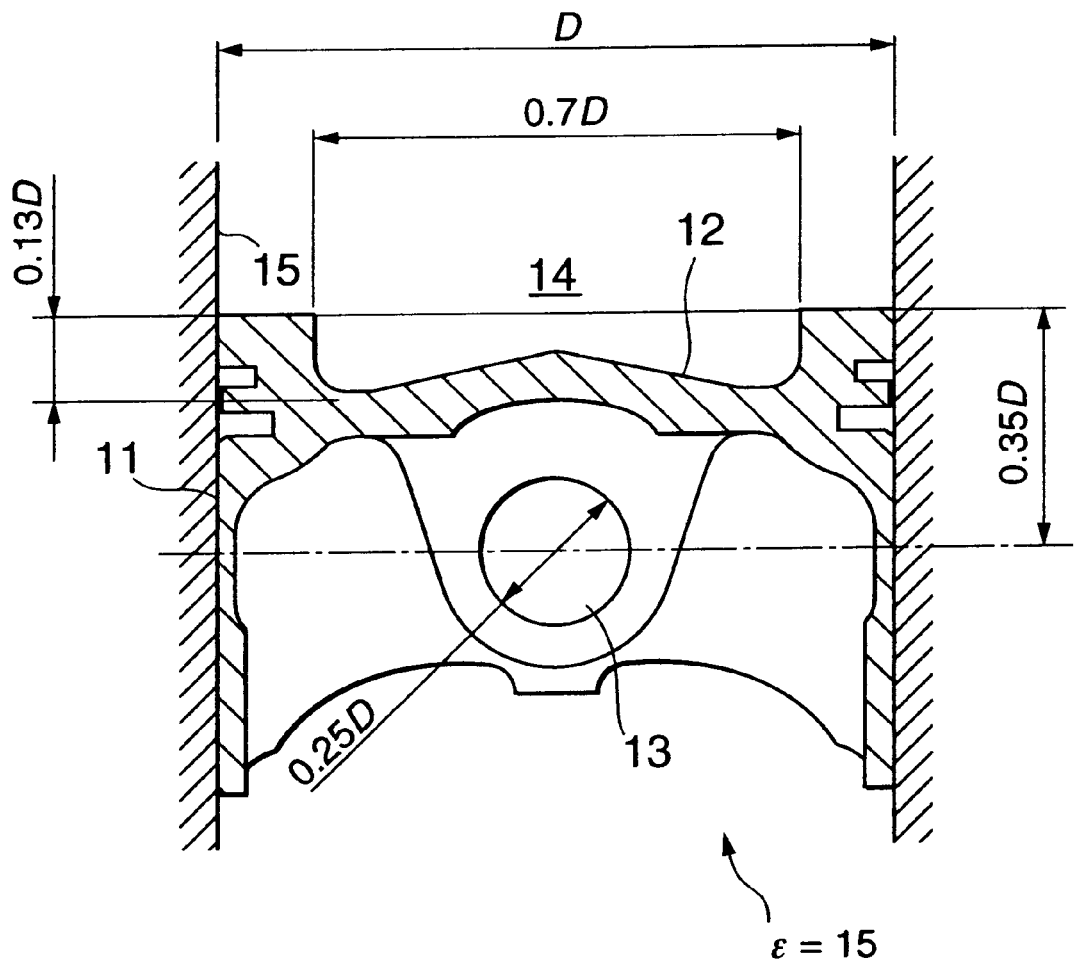
FIG. 2 is a longitudinal sectional view of an engine piston of the direct injection diesel engine according to this invention.
Figure 4A:
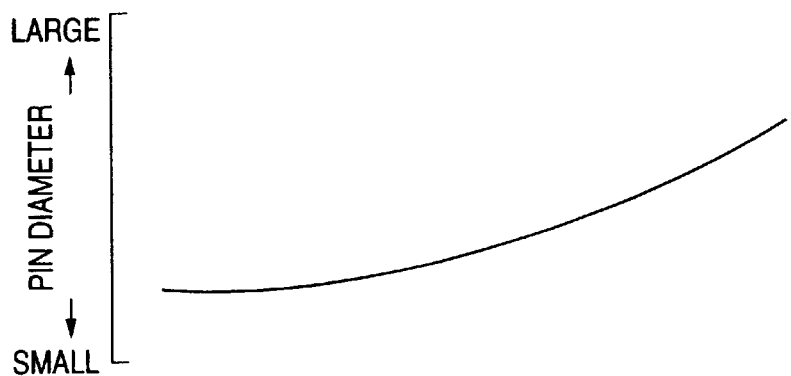
FIGS. 4A, 4B, and 4C are diagrams showing the relation of a piston specification and a cylinder internal maximum pressure (Pmax) in a general direct injection diesel engine.
Figure 4B:
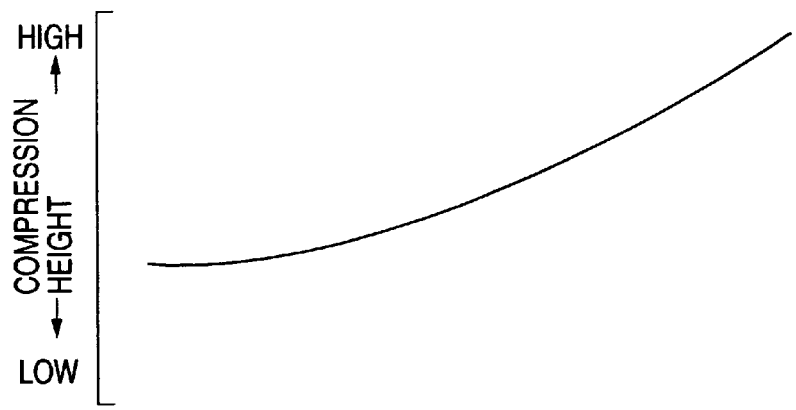
Figure 4C:
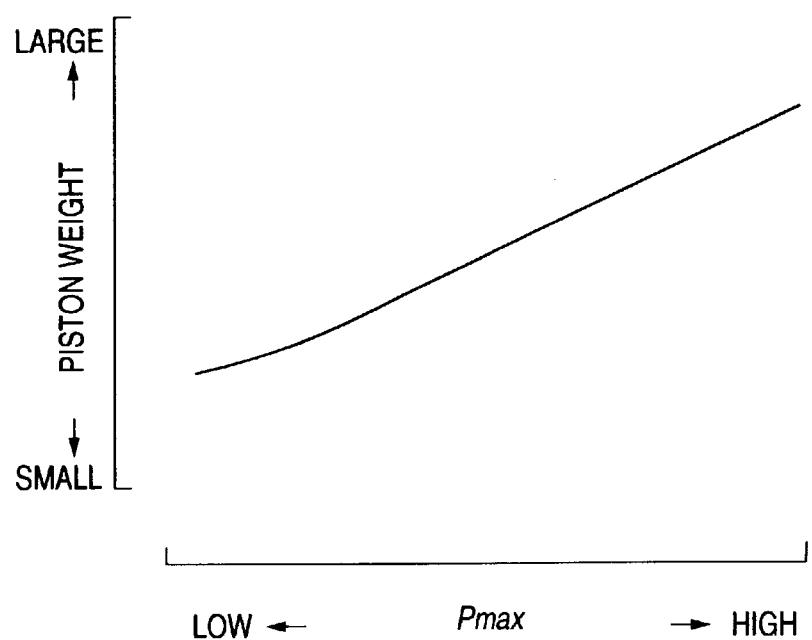

Referring to FIG. 2, a combustion chamber 14 is formed by a piston 11 in each cylinder 15. A shallow dish-shaped cavity 12 which is part of the combustion chamber 14 is formed in the top surface of the piston 11.

The depth and diameter of the cavity 12 is determined relative to the bore diameter D of the cylinder 15, in other words, the diameter of the piston 12.

In order to use a common engine body for diesel engines and gasoline engines, it is preferred that the height from the center of a piston pin 13 to the top surface of the piston, i.e., the compression height, is 0.45 D or less. The compression ratio ε in the combustion chamber 14 should also be smaller than a usual diesel engine where the compression ratio is 18 or higher.

In order to set the compression height equal to or less than 0.45 D, it is preferable to set the depth of the cavity 12 less than 0.15 D. In order to reduce the cooling loss in the combustion chamber 14 to improve fuel cost-performance, it is preferable to set the diameter of the cavity 12 larger than 0.6 D.

If the depth and diameter of the cavity 12 are set to satisfy the above conditions, the compression ratio can be set within the preferred range.

A shallow dish-shaped cavity 12 satisfying the above conditions has another merit, i.e., it reduces the generation of hydrocarbons (HC) and smoke. The amount of HC and smoke generated at a low temperature largely depends on the fuel amount adhered to the inner circumference of the cavity. A shallow dish-shaped cavity reduces the fuel amount adhered to the inner circumference of the cavity, so the generation of HC and smoke are suppressed even when the compression ratio is small.

Considering the preferable conditions, in this direct injection diesel engine 1, the diameter of the cavity 12 is set to 0.7 D, the depth of the cavity 12 is set to 0.13 D, the diameter of the piston pin 13 is set to 0.25 D, and the compression height is set to 0.35 D.

The compression ratio ε in the combustion chamber 14 due to the compression action of the piston 11 is set to 15, which is a small value compared with a usual diesel engine.

Due to the aforesaid hardware arrangement, the direct injection diesel engine 1 according to this invention performs low temperature premixture combustion. Low temperature premixture combustion is disclosed in Tokkai Hei 7-4287 published in 1995, Tokkai Hei 8-86521 published in 1996, and Tokkai Hei 11-107820 published in 1999, by the Japanese Patent Office.

The cooling device 8 cools a large amount of exhaust gas recirculated in the intake air via the exhaust recirculation passage 6.

Therefore, exhaust gas of low temperature is supplied to the combustion chamber 14 even when the engine 1 is running on high load. Also, temperature rise in the combustion chamber 14 due to compression is suppressed by lowering the compression ratio $\epsilon$ to 15. Hence, the compression maximum temperature in the combustion chamber 14 is maintained low by cooling the recirculated exhaust gas and using a low compression ratio.

The timing of fuel injection from the fuel injector 22 is retarded to compression top dead center or even later, and the fuel is injected when the temperature in the combustion chamber has fallen below the compression maximum temperature.

The ignition delay period until the injected fuel ignites is longer the lower the temperature in the combustion chamber. On the other hand, due to the high capacity of the fuel injector 22, fuel injection terminates within the ignition delay period. To terminate fuel injection within the ignition delay period, i.e., to terminate fuel injection before ignition occurs, the output values of a cylinder internal pressure sensor or an engine rotation speed sensor are differentiated or twice differentiated to calculate the ignition timing, and the fuel injection pressure and timing are determined based on this ignition timing.

By prolonging the ignition delay period and injecting all the fuel within this period, vaporization of the injected fuel is promoted. Also, as the fuel mixture in the combustion chamber 14 contains a large amount of recirculated gas, the oxygen concentration is maintained at a low level.

As a result, the injected fuel is very easily burnt due to enhancement of vaporization, but as the oxygen concentration is low, premixture combustion takes place rapidly without causing a large temperature rise. The premixture combustion which takes place under these conditions does not invoke a large delay in combustion compared to ordinary combustion under a high compression ratio.

By performing premixture combustion at a low temperature in this way, PM is suppressed to a low level. Generation of NOx is also very low since the maximum temperature and pressure are low.

The piston cavity 12 which is part of the combustion chamber 14 has a shallow dish shape of large diameter due to the aforesaid dimensional setting. Consequently, the squish generated in the combustion chamber 14 in the compression stroke of the piston 11 is not strong, and there is little turbulence in the gas flow in the combustion chamber 14. Therefore, cooling loss which depends on the gas flow in a vertical direction along the inner circumferential surface of the cavity 12, is suppressed. As a result, thermal efficiency of the engine 1 is improved, and although the start of combustion is delayed, the end of combustion is not delayed and a preferable fuel cost-performance is achieved.

By setting the compression ratio low, the pressure in the combustion chamber 14 decreases, and the compression loss is also small which contributes to improve the fuel cost-performance. Further, as the combustion maximum temperature and pressure are lower, engine endurance is improved, which means that the engine can be made more lightweight by reducing the thickness of the piston and connecting rods.

The above characteristics of this invention will now be described in further detail referring to experimental results.

FIGS. 3A–3D compare the proportion of premixture combustion, difference between injection period and ignition delay period, smoke generation amount and NOx generation amount in this direct injection diesel engine, in comparison with a prior art direct injection diesel engine, when the exhaust gas recirculation (EGR) rate and excess-air factor $\lambda$ are varied. The characteristics or the direct injection diesel engine according to this invention are shown by solid lines, and the characteristics of the prior art direct injection diesel engine are shown by dotted lines.

In the direct injection diesel engine according to this invention, compared to the prior art direct injection diesel engine, the ignition delay period exceeds the injection period due to lengthening of the ignition delay period, and the proportion of premixture combustion is largely increased. Smoke generation is suppressed low even in the region where the excess-air factor $\lambda$ is small.

FIGS. 4A–4D show the relations between the cylinder internal maximum pressure (Pmax), piston weight, compression height and piston pin diameter in a general direct injection diesel engine.

The piston used in a direct injection diesel engine generally has a deep piston cavity, so the cylinder internal maximum pressure (Pmax) is high and a large stress is generated in the piston. In other words, if the cylinder internal pressure (Pmax) is low, the piston and the piston pin boss may be made thin, piston weight and compression height can be reduced, and piston pin diameter can be made smaller.

Figure 5A:
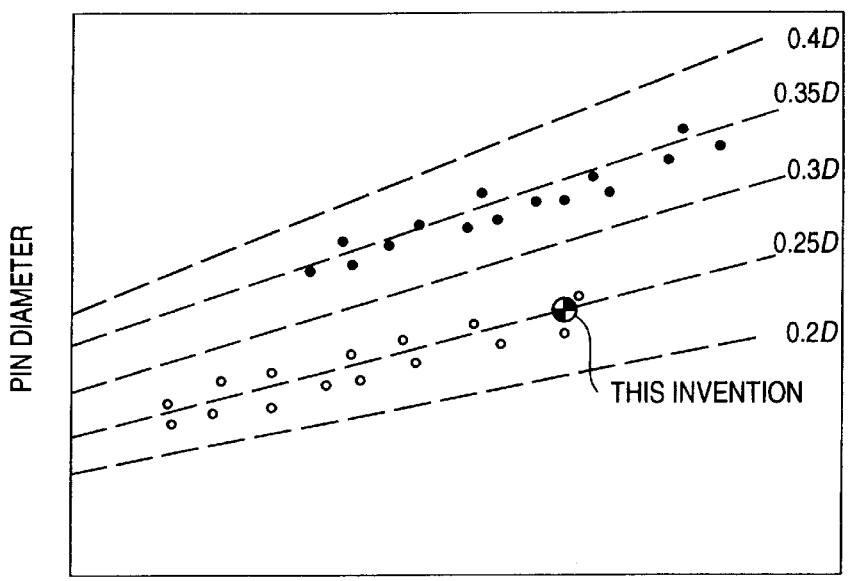
FIGS. 5A and 5B are diagrams showing the relations of a cylinder bore, pin diameter and a compression height in the direct injection diesel engine according to this invention in comparison with those of prior art diesel and gasoline engines.
Figure 5B:
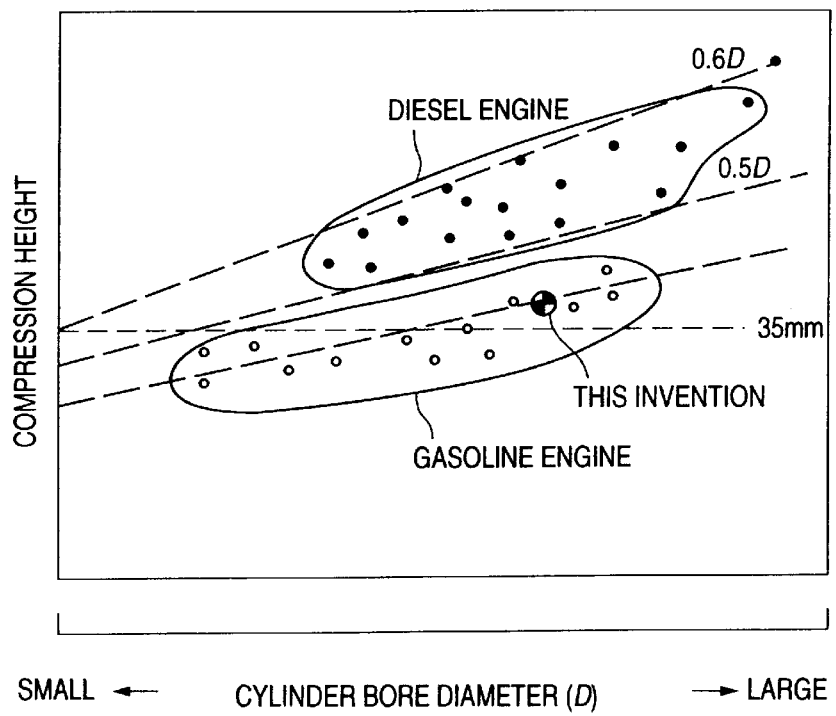

FIGS. 5A and 5B respectively show relations between the cylinder bore diameter (D), compression height and piston pin diameter in a diesel engine and a gasoline engine. According to this invention, as the cylinder internal maximum pressure (Pmax) is low, the compression height and piston pin diameter could be situated in the region of a gasoline engine.

Figure 6A:
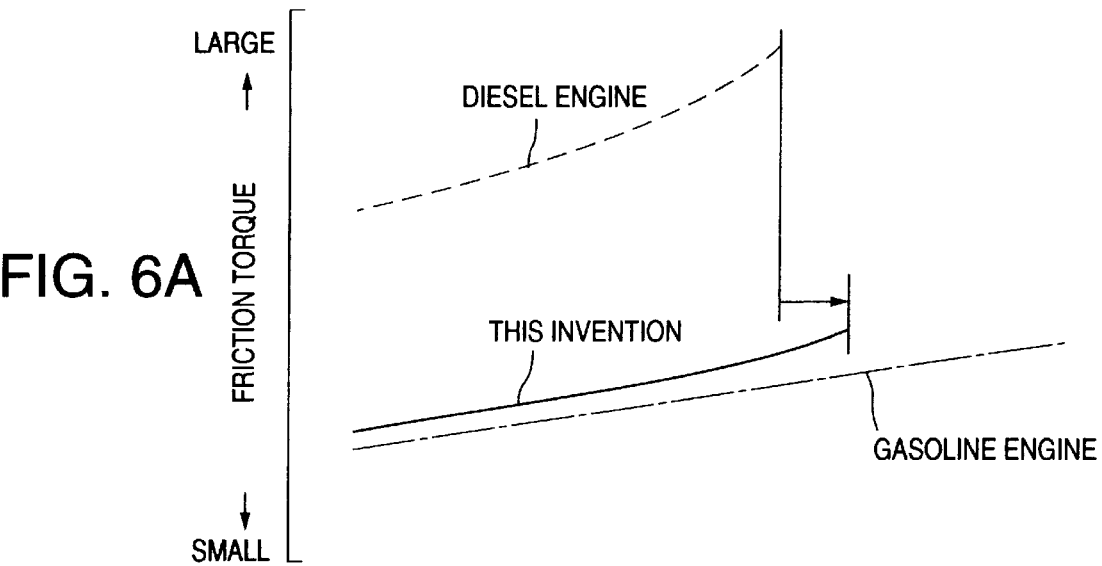
FIGS. 6A and 6B are diagrams showing the relations between an engine rotation speed, friction torque and maximum cylinder internal pressure (Pmax) in the direct injection diesel engine according to this invention in comparison with those of prior art diesel and gasoline engines.
Figure 6B:
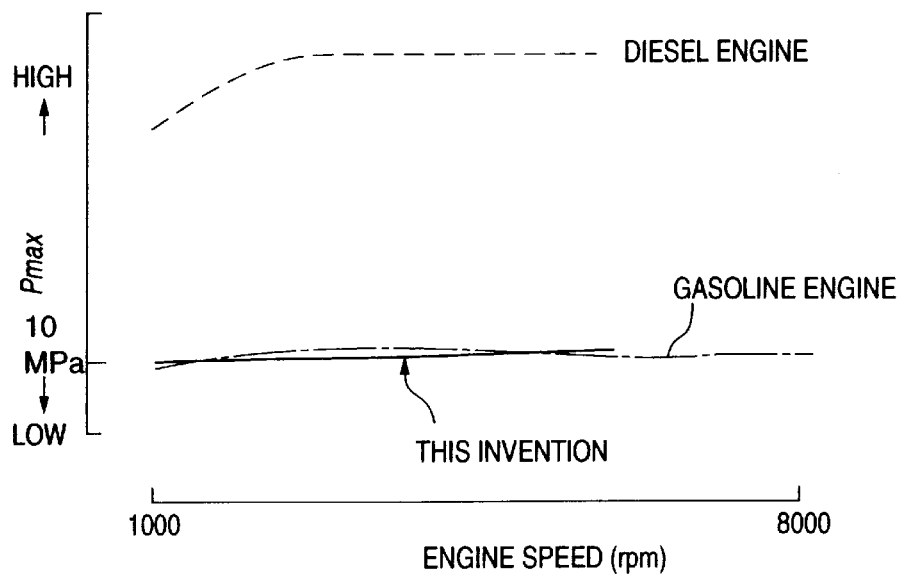

In FIGS. 6A and 6B, the cylinder internal maximum pressure (Pmax) and friction torque in the direct injection diesel engine according to this invention are compared with the prior art direct injection diesel engine and a gasoline engine. Due to the low compression ratio and lightweightness of the main moving parts in the direct injection diesel engine according to this invention, the cylinder internal maximum pressure (Pmax) and friction torque both have close values to those in a gasoline engine. As the cylinder internal maximum pressure (Pmax) of the direct injection diesel engine according to this invention is suppressed to about 10 Megapascals (MPa) and at most 12 MPa, which is of the same order as that in a gasoline engine fitted with a turbo charger, friction can be largely reduced.

However, as the fuel injection performed at higher pressure than in a gasoline engine, some increase of friction by a corresponding amount is unavoidable even in the direct injection diesel engine according to this invention.

Figure 7:
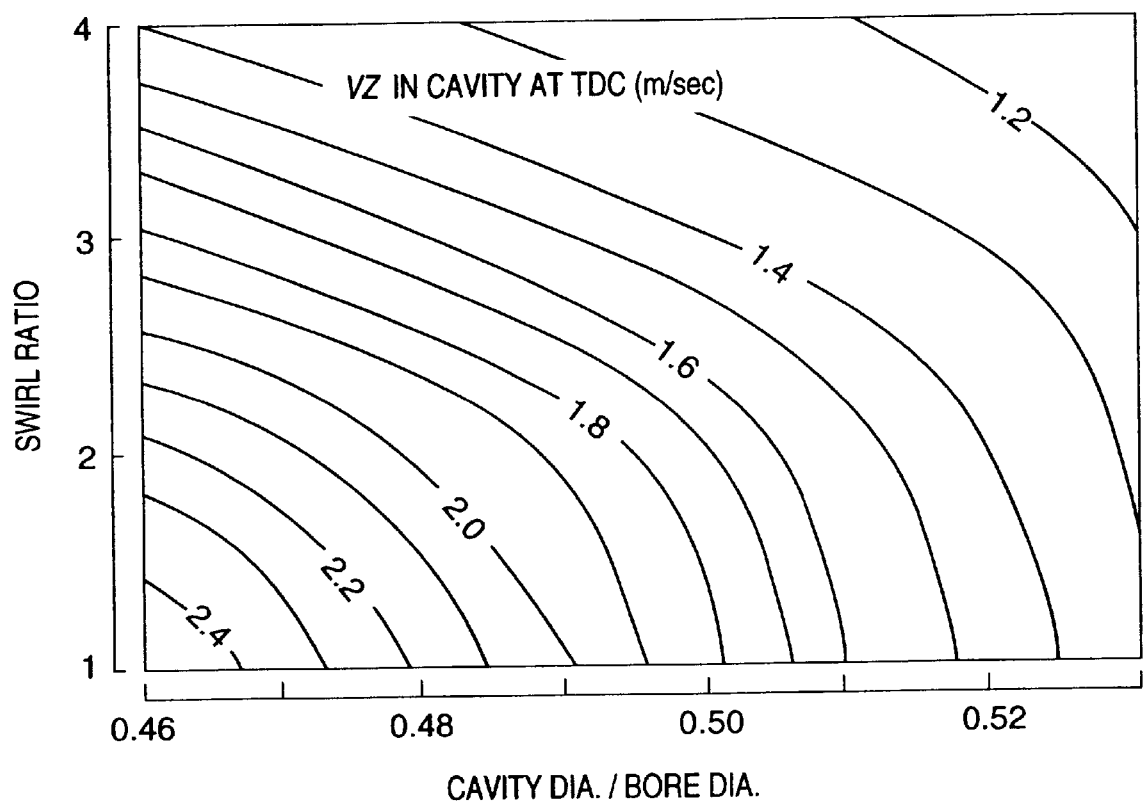
FIG. 7 is a diagram showing the relations between shape of a cavity, swirl ratio and gas velocity (VZ) in a vertical direction in the cavity in a general direct injection diesel engine.

FIG. 7 shows the relation between swirl ratio and gas velocity (VZ) in a vertical direction inside the cylinder relative to the ratio of cavity diameter and cylinder bore diameter (D) (cavity ratio). By making the cavity a large diameter, the vertical gas velocity (VZ) decreases. Also, the gas velocity (VZ) in a vertical direction decreases the larger the swirl ratio is made by the variable swirl generator 31.

Figure 8:
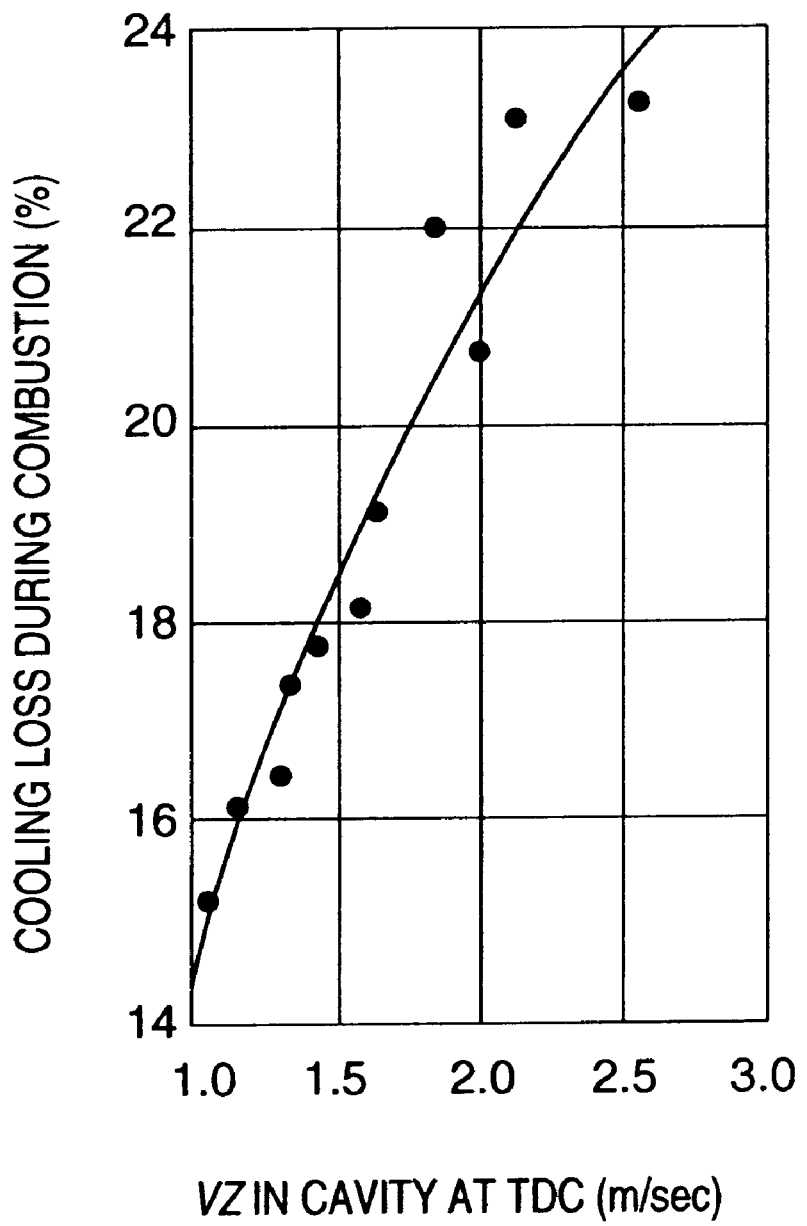
FIG. 8 is a diagram showing the relation between gas velocity (VZ) in a vertical direction and cooling loss in a general direct injection diesel engine.

FIG. 8 shows the relation between the vertical gas velocity (VZ) and cooling loss during combustion. According to the shape of the cavity of the direct injection diesel engine according to this invention, as the vertical gas velocity (VZ) is small, cooling losses are also small. If cooling losses are reduced, fuel consumption of course decreases correspondingly, and engine startability improves.

FIGS. 9A–9D compare the output characteristics of a direct injection diesel engine according to this invention with various types of direct injection diesel engines.

As can be seen from the figures, when the fuel ignition timing is delayed, the cylinder internal maximum pressure (Pmax) decreases overall and fuel consumption rate (BSFC) increases, while at the same time the output torque decreases. The fuel consumption rate (BSFC) is adversely affected if the injection timing is earlier or later than a certain timing. The excess-air factor $\lambda$ for an identical smoke concentration, increases the later the fuel injection timing.

In the direct injection diesel engine according to this invention, by decreasing the compression ratio, the cylinder internal maximum pressure (Pmax) is largely reduced compared to other engines, and due to the decrease of friction and vertical gas velocity (VZ) resulting therefrom, the fuel consumption rate (BSFC) is suppressed low and the output torque can be increased. Further, due to the decrease of cylinder internal maximum pressure (Pmax), the main engine moving parts can be made more lightweight and friction is about the same as in a gasoline engine, so torque and fuel consumption are largely improved as shown in the figures.

Still further, in the direct injection diesel engine according to this invention, as compared to the prior art diesel engine, the volume ratio due to the low compression ratio, i.e., the ratio of the volume of gas in the cylinder at top dead center to the volume of the piston cavity, is large. Therefore, the excess-air factor $\lambda$ for an identical smoke concentration is suppressed lower than in the prior art direct injection diesel engine.

Figure 10:
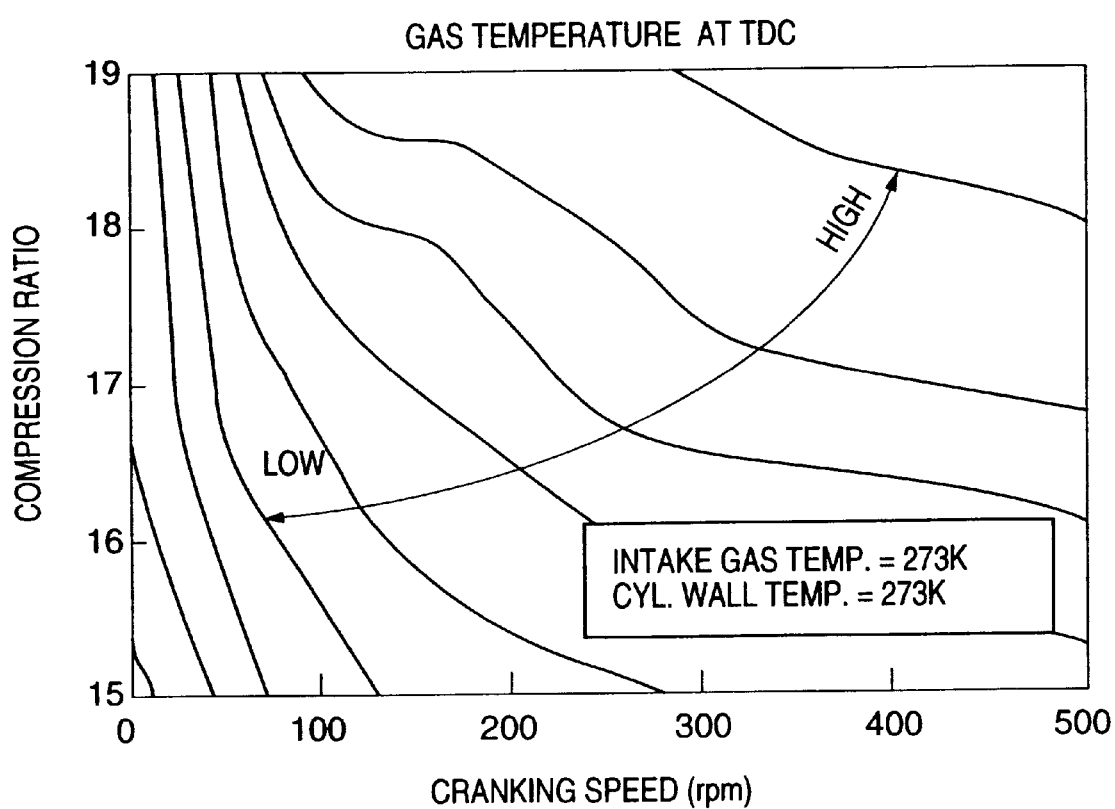
FIG. 10 is a diagram showing the gas temperature in the cylinder during the cranking of the direct injection diesel engine according to this invention.

However, when the compression ratio of the engine is made low, engine startup characteristics are usually adversely affected. FIG. 10 shows the relation of compression ratio and cylinder internal compressed gas temperature to cranking speed.

When the compression ratio is decreased, the compressed gas temperature falls, so startability is impaired. However, as is clear from this diagram, in the vicinity of 50 rpm which is a cranking speed for very low temperature startup, the variation of compressed gas temperature is more dependent on cranking speed than compression ratio.

In the direct injection diesel engine according to this invention, by reducing the compression ratio and making the main moving parts more lightweight, the cranking speed is increased by about 10–20 rpm. Hence, even if the compression ratio is low, the compressed gas temperature can be increased.

Figure 11:
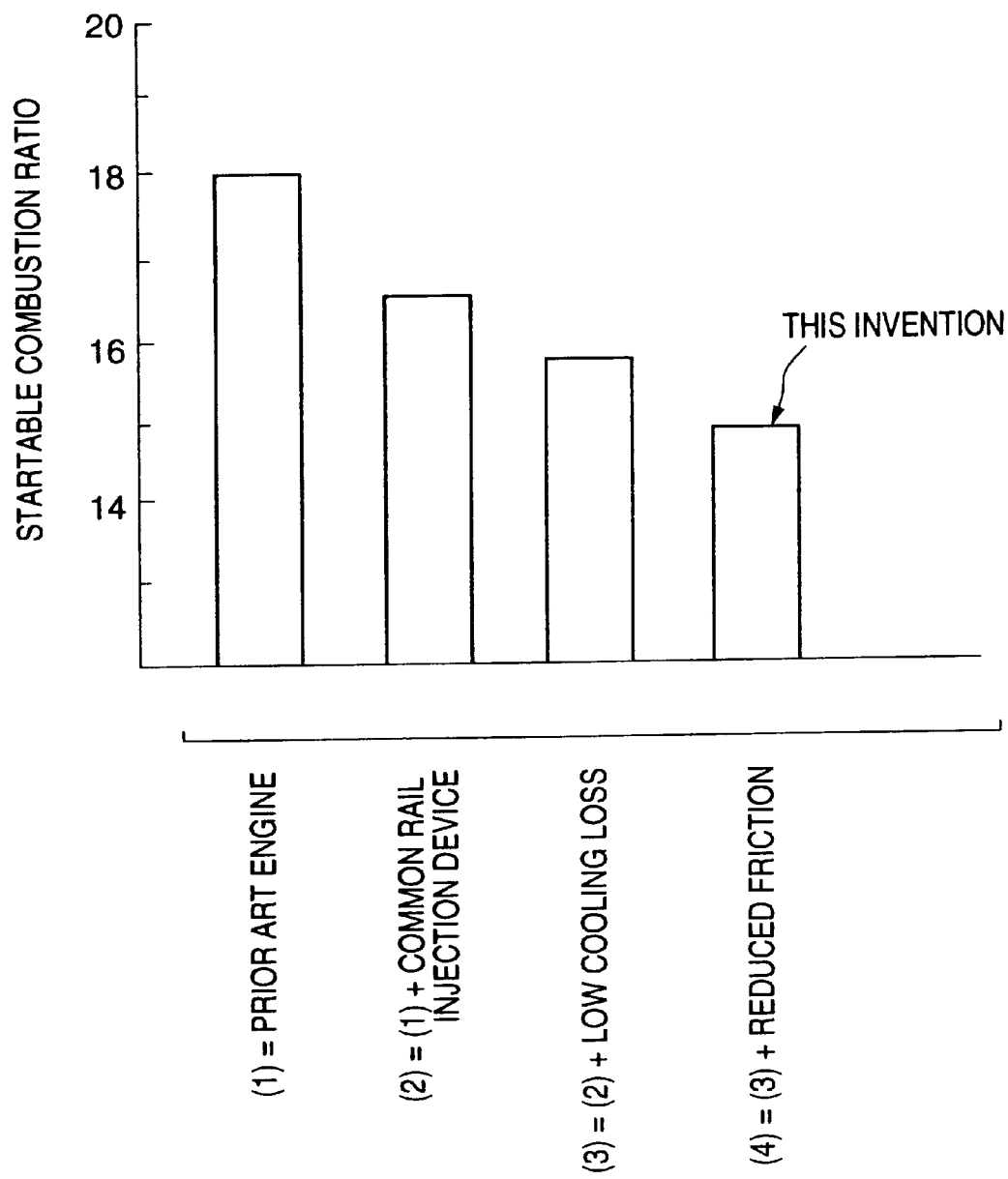
FIG. 11 is a diagram showing a compression ratio at which the direct-injection diesel engine according to this invention can be started in comparison with that of the prior art direct injection diesel engines. The diagram also shows an effect according to each element of the direct injection diesel engine according to this invention.

FIG. 11 shows the compression ratios at which various types of direct injection diesel engines can be started.

In the diesel engine according to this invention, due to the increase of cranking speed resulting from lower friction and decrease of cooling loss, the compression ratio $\epsilon$ at which startup is possible is reduced to 15. In the prior art direct injection diesel engine, 18 is the compression ratio at which startup can be performed. Even in the prior art direct injection diesel engine, by providing a common rail fuel injection device, which can largely advance the injection timing during startup and increase the injection pressure, the compression ratio can be reduced to less than 18.

As understood from the above, in the direct injection diesel engine according to this invention, engine exhaust composition is improved, output performance is enhanced, and good startability is also maintained. Further, in the direct injection diesel engine according to this invention, the compression ratio is low, and the cylinder internal maximum pressure (Pmax) is also low. Moreover, as a deep cavity in the piston 11 is not necessary, the compression height is also low. Therefore, the component parts of the engine body such as for example the cylinder block, connecting rods and crankshaft can be shared with a gasoline engine having the same cylinder capacity.

Next, a second embodiment of this invention will be described referring to FIGS. 12–14.

Figure 12:
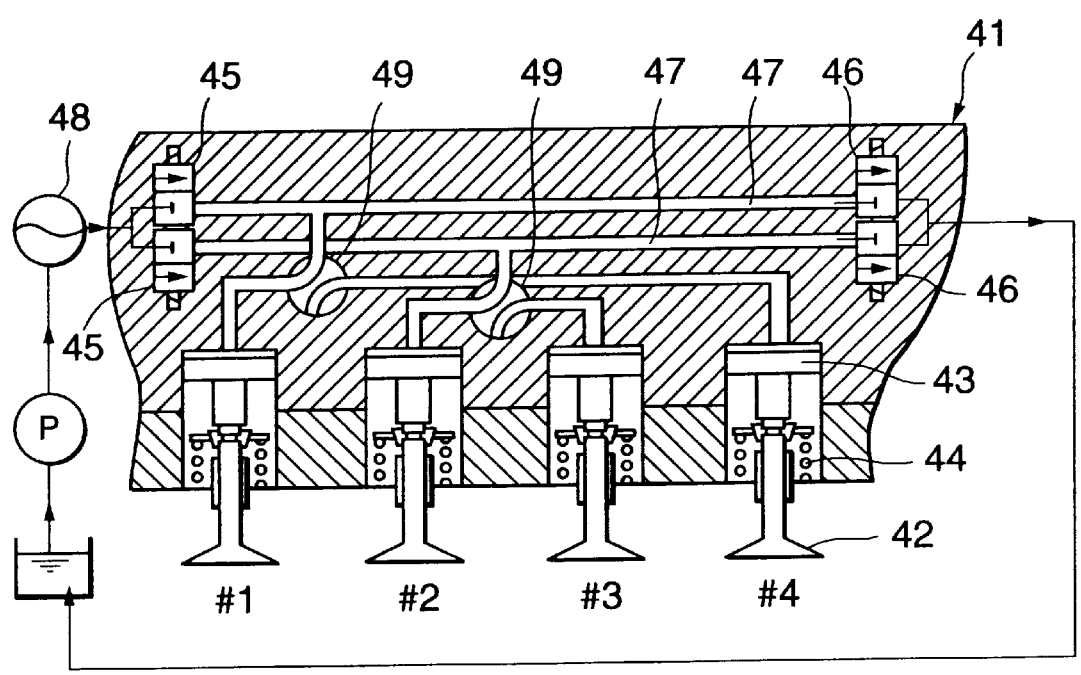
FIG. 12 is a longitudinal sectional view of a variable valve operating mechanism of a direct injection diesel engine according to a second embodiment of this invention.
Figure 13:
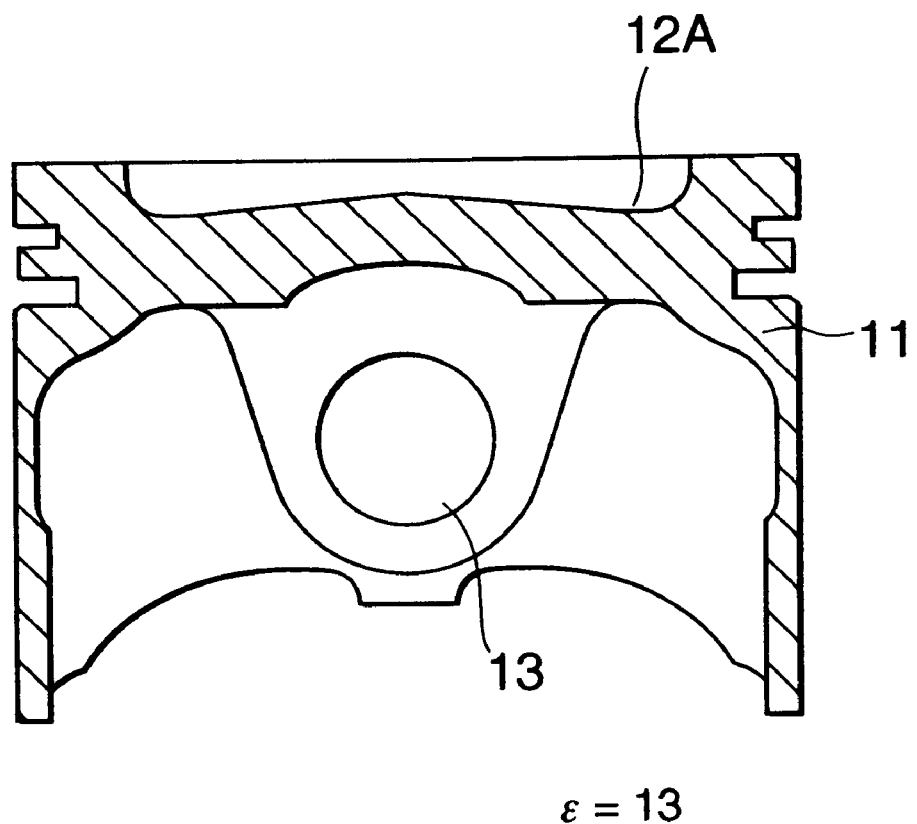
FIG. 13 is a longitudinal sectional view of a piston of the direct injection diesel engine according to the second embodiment of this invention.

The direct injection diesel engine according to the second embodiment differs from that of the first embodiment in that it comprises a variable valve mechanism as shown in FIG. 12 and very shallow dish-shaped cavity shown in FIG. 13. The remaining features of the construction are identical to those of the first embodiment.

Referring to FIG. 12, a variable valve mechanism 41 is a mechanism which varies the timing of intake valves 42. The intake valve 42 of each cylinder opens and closes according to the displacement of a piston 43. In other words, when an oil pressure acts on the piston 43, the intake valve 42 is pressed down against a valve spring 44 so that it opens. When the oil pressure is released, the valve spring 44 closes the intake valve 42.

In a four-cylinder engine, to control the oil pressure acting on the piston 42, oil pressure accumulated in an accumulator 48 via a pump is selectively supplied to either of a pair of main circuits 47 via a pair of oil pressure supply valves 45. A pair of oil pressure release valve 46 are also provided to release the fuel pressure in the main circuits 47.

A change over valve 49 is provided in each of the main circuits 47. One of the change-over valves 49 selectively connects one of the pistons 43 of a cylinder #1 and of a cylinder #4 to the corresponding main circuit 47 according to the crank angle of the engine. The other change overvalve 49 selectively connects one of the pistons 43 of a cylinder #2 and of a cylinder #3 to the corresponding main circuit 47 according to the crank angle of the engine.

When either of the oil pressure supply valves 45 opens, a high-pressure acts on one of the pistons 43 via the main circuit 47 and the corresponding change-over valve 49, and the intake valve 42 therefore opens. When the oil pressure supply valve 45 closes, the oil pressure release valves 46 of the same main circuit 47 open, the oil pressure in the main circuits 47 is released, and the intake valve 42 closes.

Therefore, by controlling the action of the oil pressure supply valves 45 and the oil pressure release valves 46, the opening timing and valve opening period of the intake valves 42 can be controlled.

Referring to FIG. 13, a very shallow dish-shaped cavity 12A is formed over the whole region of the upper surface of the piston 11 in the direct injection diesel engine according to the second embodiment, so generation of squish in the combustion chamber is thereby largely restricted. If the cylinder bore diameter is D, the diameter of the cavity 12A is larger than 0.7 D and the depth of the cavity 12A is less than 0.13 D.

Also, the compression ratio is set to a low compression ratio E=13 still lower than that of the first embodiment.

Figure 14:
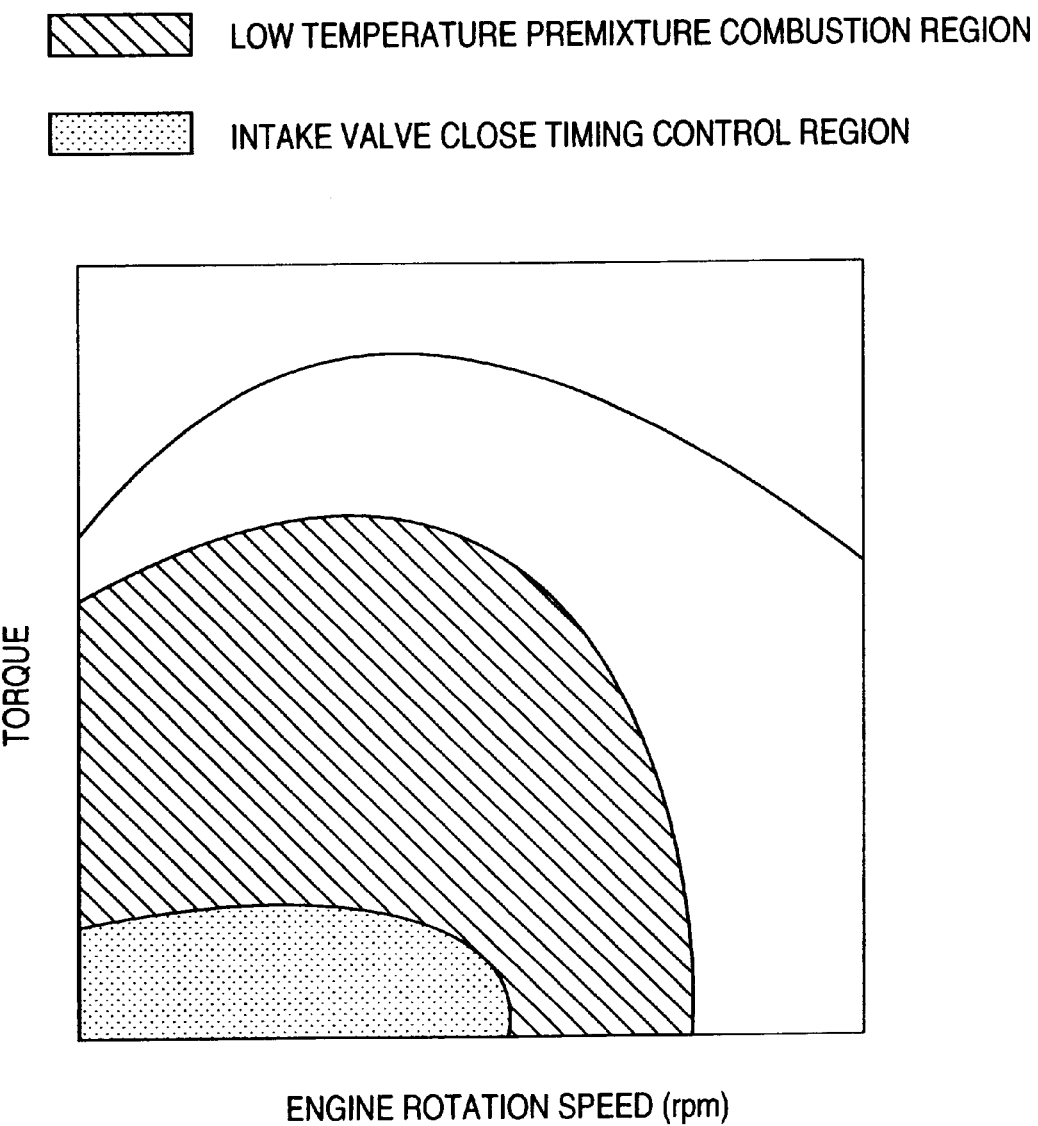
FIG. 14 is a diagram showing control regions of an intake valve of the direct injection diesel engine according to the second embodiment of this invention.

Referring to FIG. 14, in the direct injection diesel engine according to the second embodiment, the intake valve closing timing is advanced in the running region where the engine rotation speed and engine torque, which represent the engine load, are both small. Normally, to increase air charging efficiency at high rotation speed, the intake valve 42 is left open for some time after the piston compression stroke starts, but in the low rotation speed region, by closing the intake valve earlier so that the closing timing approaches bottom dead center, the effective compression ratio is increased.

Figure 15:
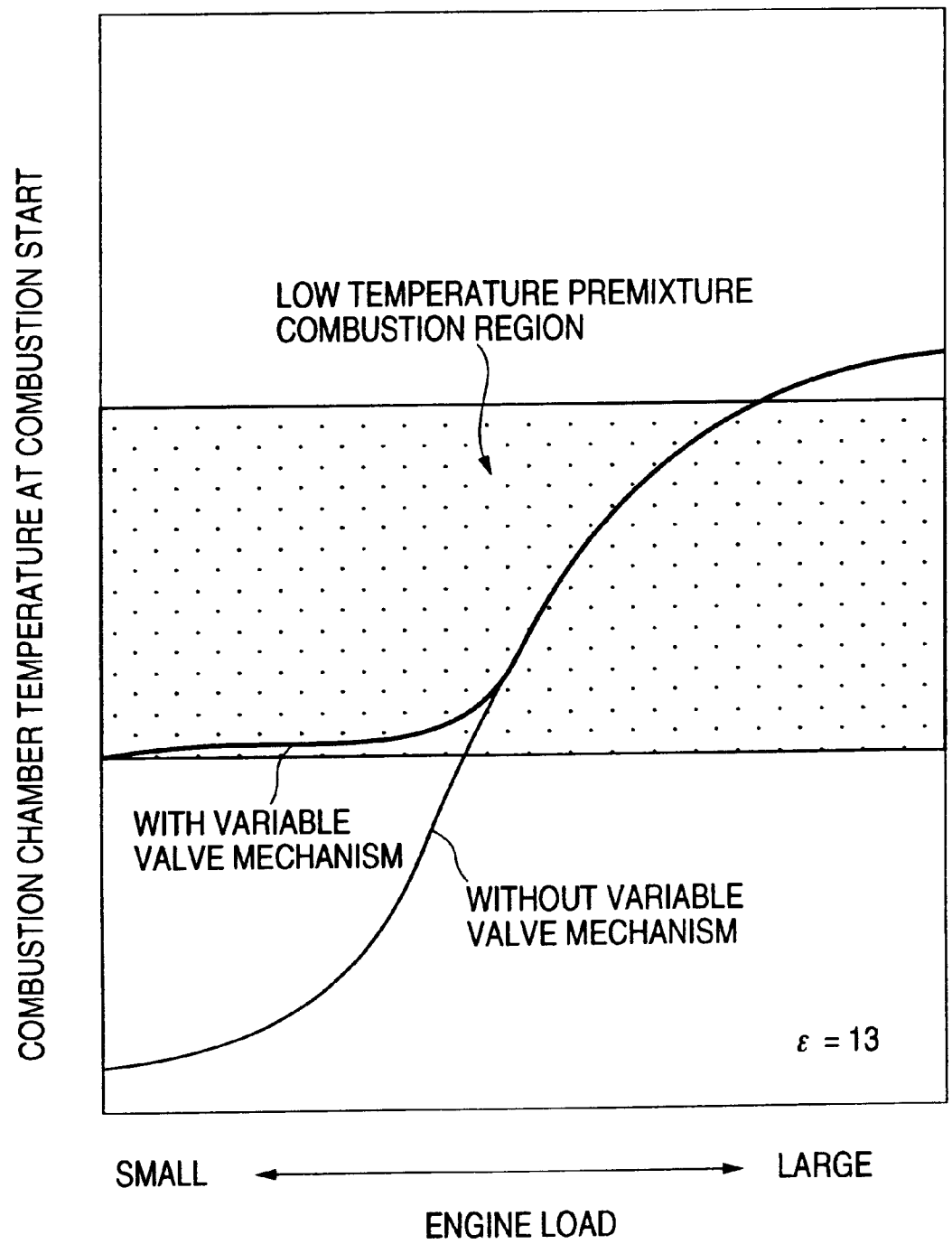
FIG. 15 is a diagram showing the relation between an engine load and a combustion start temperature of the direct injection diesel engine according to the second embodiment of this invention.

FIG. 15 shows a relation between the engine load and the temperature of the combustion chamber when combustion starts in the direct injection diesel engine according to the second embodiment providing that the compression ratio is constant.

In general, the temperature increases the higher the load. By closing the intake valve 42 in the vicinity of bottom dead center in the low load region, the effective compression ratio can easily maintain the temperature required for low temperature premixture combustion even at a compression ratio $\epsilon=13$.

Figures 16A, 16B, 16C:
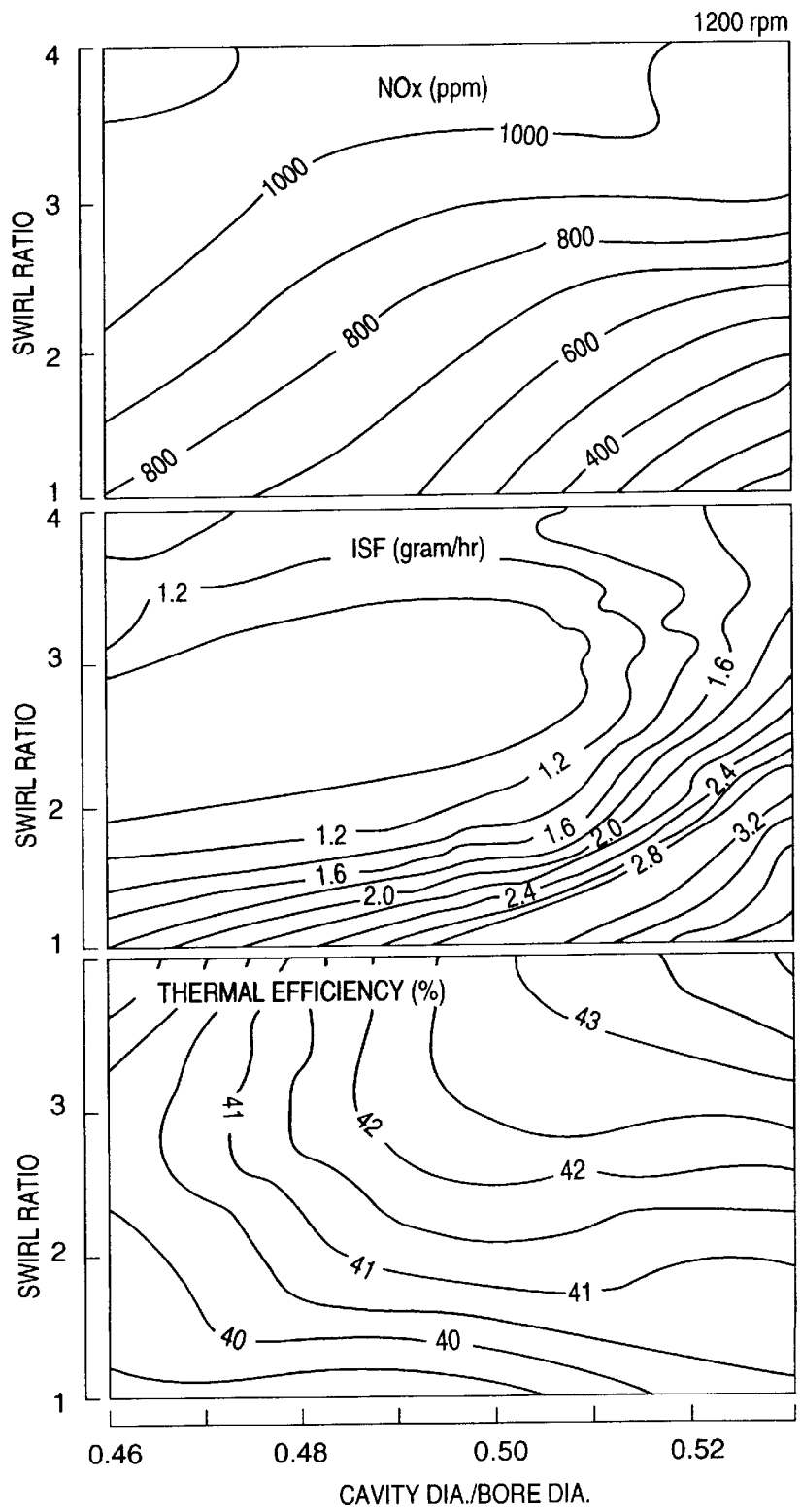
FIGS. 16A–16C are diagrams showing variation of amount of nitrogen oxides (NOx), amount of smoke (ISF) and thermal efficiency relative to swirl ratio and cavity ratio in a general direct injection diesel engine.

By adopting a very shallow dish shape for the cavity 12A of the piston 11, as shown in FIGS. 16A–16C, the vertical gas velocity (VZ) decreases, cooling losses are reduced and thermal efficiency is improved. At the same time, the larger diameter of the cavity due to the very shallow dish shape contributes to reducing NOx discharge amount at the same swirl ratio and to increasing the discharge amount of smoke (ISF).

FIG. 17A–17D show the variation of turbulence energy (TE), gas velocity (Vθ) in the inner circumferential direction of the cavity, gas velocity (VR) in the radial direction of the cavity and gas velocity (VZ) in the vertical direction, which are representative values of the gas flow in the combustion chamber. The velocity components are absolute values independent of direction.

FIG. 18 shows the effect of turbulence energy (TE), gas velocity (Vθ) in the inner circumferential direction of the cavity, gas velocity (VR) in the radial direction of the cavity and gas velocity (VZ) on cooling loss, worker efficiency, NOx generation amount, and smoke (dry soot) generation amount at a fixed engine rotation speed and engine load.

The work efficiency, NOx generation amount and smoke generation amount are largely affected by the turbulence energy (TE) and gas velocity (Vθ) in the inner circumferential direction of the cavity. On the other hand, cooling losses are not affected by these factors, but are largely affected by the radial gas velocity (VR) and vertical gas velocity (VZ) in the cavity. Therefore, if the turbulence energy (TE) is held at or above a constant value while reducing the vertical gas velocity (VZ), the work efficiency can be improved and smoke generation amount can be reduced while maintaining cooling losses at a low level.

Figure 17C:
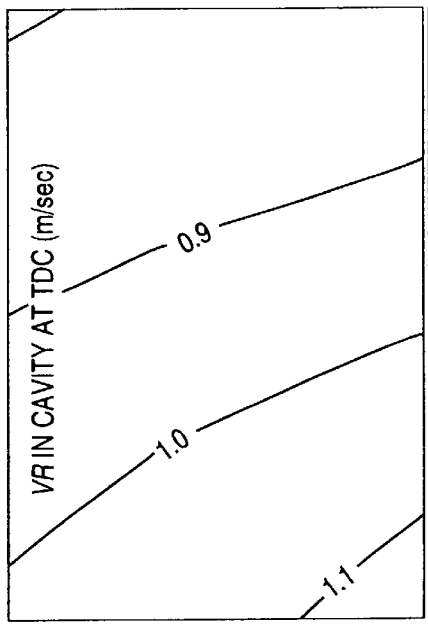
FIGS. 17A–17D are diagrams showing a variation of turbulence energy (TE), cavity inner circumferential velocity (Vθ), radial velocity (VR) and vertical velocity (VZ) relative to swirl ratio and cavity ratio in a general direct injection diesel engine.
Figure 17D:
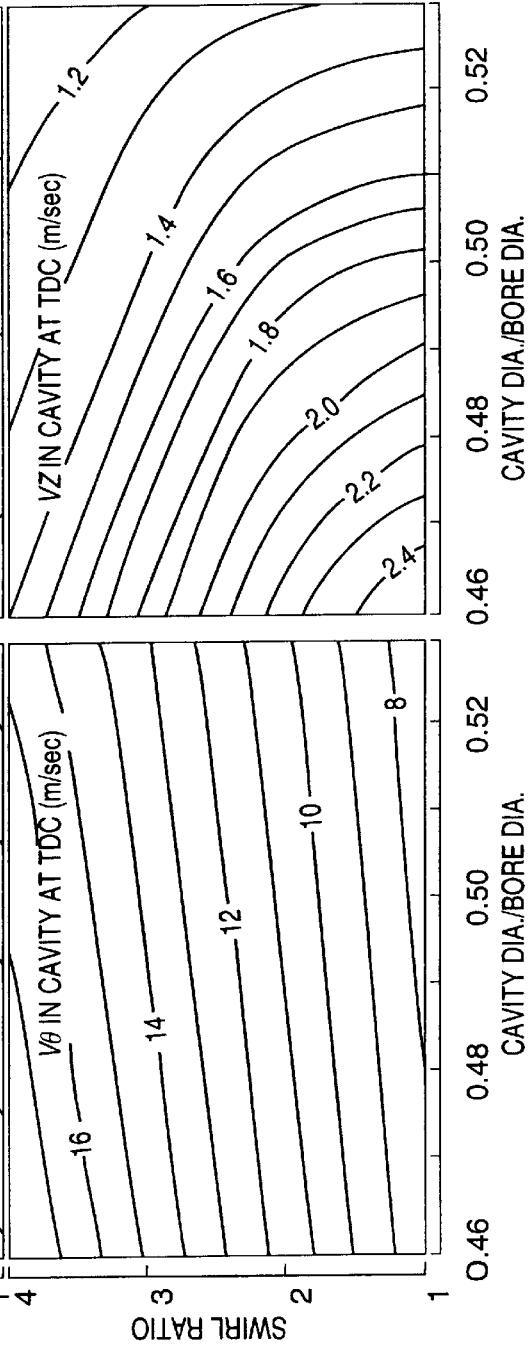
Figure 17A:
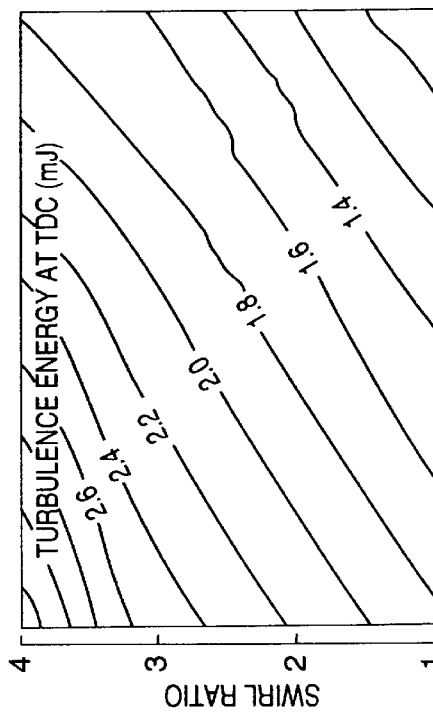
Figure 17B:
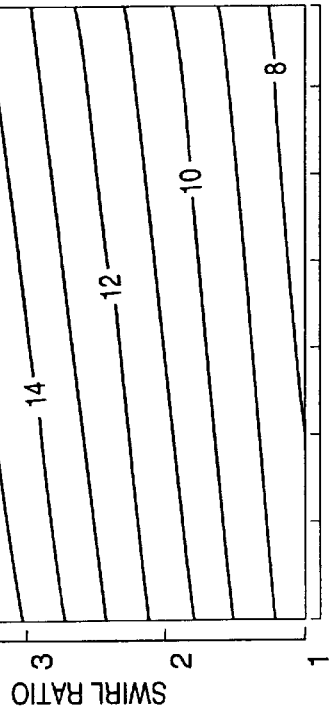

To reduce vertical gas velocity, it is desirable, from FIG. 17C, to increase the diameter of the cavity. Also, to maintain the turbulence energy (TE) at or above a fixed value, from FIG. 17B, it is desirable to increase the swirl ratio.

In the direct injection diesel engine according to the second embodiment, a powerful intake swirl is set up mainly in the low load region by the variable swirl generator 31, and the vertical gas velocity (VZ) is reduced by using the very shallow dish shaped cavity 12A, so increase of fuel consumption is avoided while suppressing smoke generation.

Figure 19A:
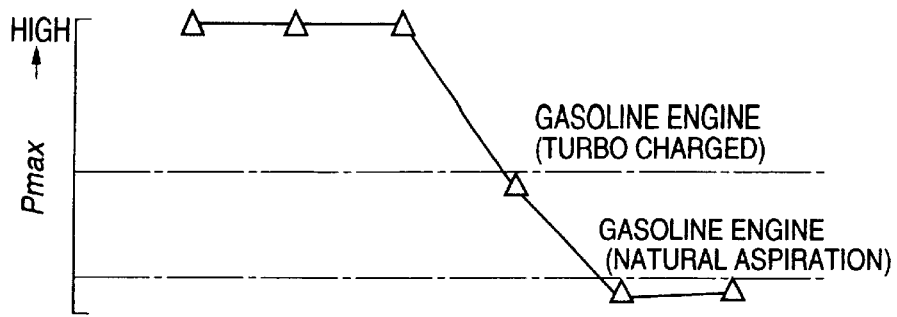
FIGS. 19A–19C are diagrams comparing thermal efficiency, maximum excess-air factor (λmax) and cylinder internal maximum pressure (Pmax) in the direct injection diesel engines according to the first and second embodiments of this invention with those of various direct injection diesel engines.
Figure 19B:
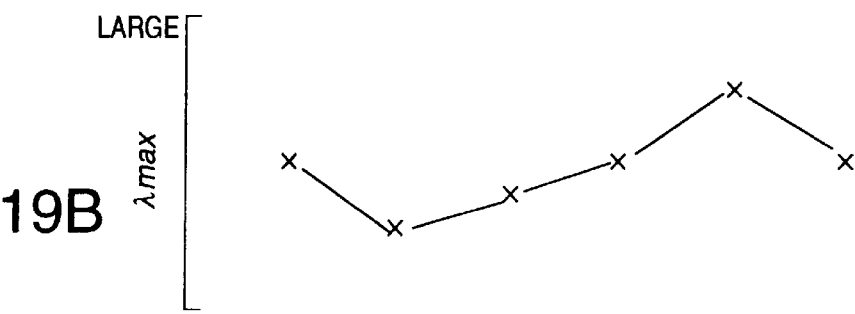
Figure 19C:
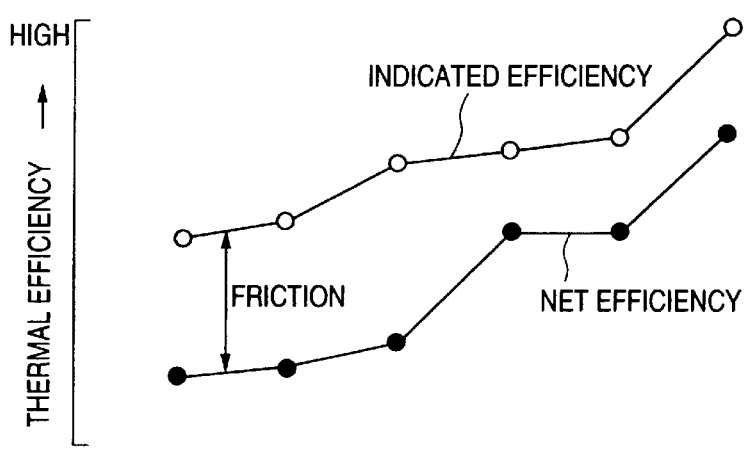

FIGS. 19A–19C compare cylinder internal maximum pressure (Pmax), maximum excess-air factor (λmax) and thermal efficiency in the case of the direct injection diesel engine according to the second embodiment, the direct injection diesel engine according to the first embodiment and the prior art direct injection diesel engine. The diagrams also show an effect according to each element of the first and second embodiments of this invention.

In the first embodiment, due to the large diameter, low compression and resulting lower friction in the first embodiment, thermal efficiency is improved and the cylinder internal maximum pressure (Pmax) falls. In the second embodiment, if only the very shallow dish cavity is used, cooling losses are reduced, but thermal efficiency is not improved so much due to decrease of work efficiency. However, by increasing turbulence energy resulting from the increase of swirl ratio, work efficiency is improved, thermal efficiency improves and smoke generation amount is reduced. Further, the maximum excess-air factor λmax also falls.

Figure 20:
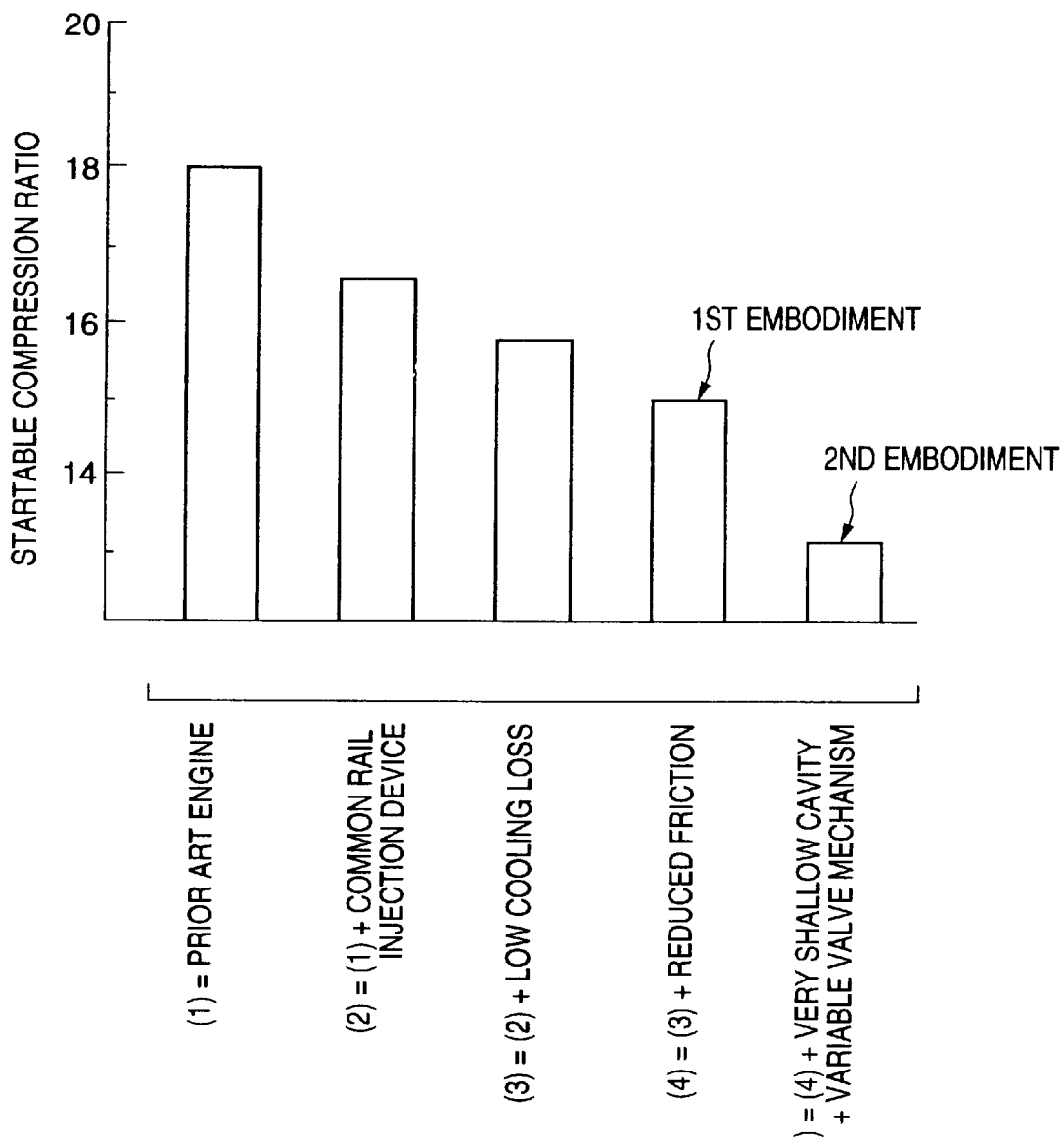
FIG. 20 is a diagram comparing a startable combustion ratio in the direct injection diesel engines according to the first and second embodiments of this invention with that of various direct injection diesel engines.

The compression ratio at which the engine can be started will now be described referring to FIG. 20. In the direct injection diesel engine according to the second embodiment, cooling losses are reduced due to the very shallow dish-shaped cavity, and as the effective compression ratio is increased due to the variable valve mechanism 41, the compression temperature can be raised to the temperature required to start the engine even at a low compression ratio. Therefore, good startability performance is maintained even at the compression ratio $\epsilon=13$.

The contents of Tokugan Hei 11-76222, with a filing date of Mar. 13, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A direct injection diesel engine which directly injects fuel into a combustion chamber, comprising:
   a cylinder;
   a piston forming the combustion chamber in the cylinder;
   a fuel injector which starts injection of fuel at a timing not before compression top dead center of the piston, and finishes the injection of all of a required amount of fuel during an ignition delay period;
   an exhaust recirculation passage which decreases an oxygen concentration in the combustion chamber by mixing part of the exhaust gas discharged from the combustion chamber with intake air of the combustion chamber; and
   a squish suppressing mechanism which suppresses a squish formed in the combustion chamber;
   wherein a maximum pressure in the combustion chamber is set not greater than twelve Megapascals.

2. A direct injection diesel engine as defined in claim 1, wherein a compression ratio of the engine is set not greater than fifteen.

3. A direct injection diesel engine as defined in claim 1, wherein the piston comprises a piston pin, and a distance from a center of the piston pin to a top surface of the piston is set not greater than forty five percent of a bore diameter of the cylinder.

4. A direct injection diesel engine as defined in claim 3, wherein the distance from the center of the piston pin to the top surface of the piston is set equal to thirty five percent of the bore diameter of the cylinder.

5. A direct injection diesel engine as defined in claim 1, wherein the squish suppressing mechanism comprises a variable swirl generator which sets up a swirl in the combustion chamber.

6. A direct injection diesel engine as defined in claim 1, wherein the squish suppressing mechanism comprises a cavity formed on a top surface of the piston, the cavity having a diameter larger than sixty percent of a bore diameter of the cylinder, and a depth smaller than fifteen percent of the bore diameter of the cylinder.

7. A direct injection diesel engine as defined in claim 6, wherein the diameter of the cavity is equal to seventy percent of the bore diameter of the cylinder, and the depth of the cavity is set equal to thirteen percent of the bore diameter of the cylinder.

8. A direct injection diesel engine as defined in claim 1, wherein the engine comprises an accumulator for supplying high-pressure fuel to the fuel injector, and the fuel injector comprises a solenoid valve.

9. A direct injection diesel engine as defined in claim 1, wherein the engine further comprises an intake valve for aspirating air to the combustion chamber, and a variable valve mechanism which increases the effective combustion ratio by delaying the closing timing of the intake valve.

10. A direct injection diesel engine as defined in claim 9, wherein the squish suppressing mechanism comprises a cavity formed on a top surface of the piston, the cavity having a diameter larger than seventy percent of a bore diameter of the cylinder, and a depth smaller than thirteen percent of the bore diameter of the cylinder.

11. A direct injection diesel engine as defined in claim 10, wherein the compression ratio of the engine is set equal to thirteen.

12. A method for enabling low temperature premixture combustion in a direct injection diesel engine which directly injects fuel into a combustion chamber formed by a piston by means of a fuel injector, the method comprising:

retarding a fuel injection timing of the fuel injector to a timing not before compression top dead center of the piston;

determine a fuel injection amount of the fuel injector so that an injection of all of a required amount of fuel is completed within an ignition delay period;

decreasing an oxygen concentration of the combustion chamber by mixing a part of exhaust gas discharged from the combustion chamber with an intake air of the combustion chamber;

setting a compression ratio of the engine not greater than fifteen;

suppressing a squish formed in the combustion chamber; and setting a maximum pressure in the combustion chamber not greater than twelve Megapascals.

13. A method for enabling low temperature premixture combustion as defined in claim 12, wherein the method suppresses the squish by generating a swirl in the combustion chamber while maintaining a turbulence energy in the combustion chamber at not less than a predetermined value.

* * * * *